US012110922B2

United States Patent
Verbickas et al.

(10) Patent No.: US 12,110,922 B2
(45) Date of Patent: Oct. 8, 2024

(54) SLIDE MEMBER

(71) Applicant: DAIDO METAL COMPANY LTD., Nagoya (JP)

(72) Inventors: Rolandas Verbickas, Somerset (GB); Yuma Haneda, Inuyama (JP); Yi Zhang, Somerset (GB)

(73) Assignee: DAIDO METAL COMPANY LTD., Nagoya (JP)

( * ) Notice: Subject to any disclaimer, the term of this patent is extended or adjusted under 35 U.S.C. 154(b) by 314 days.

(21) Appl. No.: 17/631,379

(22) PCT Filed: Jun. 30, 2020

(86) PCT No.: PCT/JP2020/025610
§ 371 (c)(1),
(2) Date: Jan. 28, 2022

(87) PCT Pub. No.: WO2021/020002
PCT Pub. Date: Feb. 4, 2021

(65) Prior Publication Data
US 2022/0325752 A1     Oct. 13, 2022

(30) Foreign Application Priority Data
Jul. 31, 2019     (JP) .................. 2019-141293

(51) Int. Cl.
*F16C 33/12*     (2006.01)
*C25D 3/54*     (2006.01)
*C25D 7/10*     (2006.01)

(52) U.S. Cl.
CPC ................ *F16C 33/12* (2013.01); *C25D 3/54* (2013.01); *C25D 7/10* (2013.01); *Y10T 428/12056* (2015.01)

(58) Field of Classification Search
None
See application file for complete search history.

(56) References Cited

U.S. PATENT DOCUMENTS 6,309,759 B1   10/2001   Tomikawa et al.
7,128,981 B2   10/2006   Kawachi et al.
(Continued)

FOREIGN PATENT DOCUMENTS

GB     2379449 A     3/2003
GB     2534120 A     7/2016
(Continued)

OTHER PUBLICATIONS

Extended European Search Report dated Jun. 26, 2023 in corresponding EP Application No. EP 20 84 6008.
(Continued)

*Primary Examiner* — Seth Dumbris
(74) *Attorney, Agent, or Firm* — Harness, Dickey & Pierce, P.L.C.

(57) ABSTRACT

Provided is a slide member having an overlay on a bearing alloy. The overlay has a thickness T and has a sliding surface and an interface with respect to the bearing alloy. The overlay includes an intermetallic compound and a matrix of Bi or a Bi alloy. In a thickness domain constituting 70%-75% of the thickness T of the overlay from the sliding surface to the interface, the volume proportion of the intermetallic compound is 10%-70%.

9 Claims, 1 Drawing Sheet

(56) References Cited

U.S. PATENT DOCUMENTS

| | | | |
|---|---|---|---|
| 2003/0048961 A1 | 3/2003 | Kawachi et al. | |
| 2006/0245675 A1* | 11/2006 | Lang | F16C 17/02 384/95 |
| 2008/0102307 A1 | 5/2008 | Zidar | |
| 2012/0277131 A1* | 11/2012 | Asakura | C25D 7/10 508/103 |
| 2013/0025132 A1 | 1/2013 | Martinsson et al. | |
| 2013/0316189 A1 | 11/2013 | Asakura et al. | |

FOREIGN PATENT DOCUMENTS

| | | | |
|---|---|---|---|
| JP | 2001-020955 A | 1/2001 | |
| JP | 2003-156045 A | 5/2003 | |
| JP | 2003-156046 A | 5/2003 | |
| JP | 2004-353042 A | 12/2004 | |
| JP | 2008-57769 A | 3/2008 | |
| JP | 2011-163382 A | 8/2011 | |
| JP | 2019-026923 A | 2/2019 | |
| WO | WO-2012/108528 A1 | 8/2012 | |
| WO | WO-2014/157193 A1 | 10/2014 | |

OTHER PUBLICATIONS

International Search Report (in English and Japanese) and Written Opinion (in Japanese) of the International Searching Authority issued in PCT/JP2020/025610, mailed on Sep. 15, 2020; ISA/JP.
Office Action dated Jan. 2, 2024 in corresponding Chinese Patent Application No. 202080055097.

* cited by examiner

SLIDE MEMBER

CROSS REFERENCE TO RELATED APPLICATIONS

This application is a U.S. National Phase Application under 35 U.S.C. 371 of International Application No. PCT/JP2020/025610 filed on Jun. 30, 2020, which claims the benefit of priority from Japanese Patent Application No. 2019-141293 filed on Jul. 31, 2019. The entire disclosures of all the above applications are incorporated herein by reference.

TECHNICAL FIELD

The present invention generally relates to a sliding member for an internal combustion engine and the like, and particularly to a structure of an overlay layer of the sliding member in which intermetallic compounds are dispersed. The present invention also relates to a bearing including the sliding member, and to an internal combustion engine including the bearing.

BACKGROUND ART

Many sliding members for bearings of internal combustion engines and the like include a copper bearing alloy or an aluminum bearing alloy bonded to a steel back metal. The copper or aluminum alloy provides the sliding members with a strong surface for bearing a load applied to the sliding member while being used. Such a sliding member is required to have not only good embedding properties and conformability but also appropriate seizure resistance. For this purpose, a soft overlay of a material such as lead or a lead alloy has commonly been provided on the surface of the bearing alloy. Lead has conventionally been known as a coating material with high reliability that has the above properties as well as appropriate fatigue resistance against an external load.

However, from the viewpoint of environmental pollution, the use of lead is required to be avoided, and thus a Bi alloy is proposed as an alternative overlay material. Patent Literature 1 discloses a Bi-based material having fatigue resistance and conformability that is obtained by setting an crystal orientation of grains of a Bi/Bi alloy layer to an intermediate orientation between a completely random orientation and a single specific orientation such as a single crystal in order to reduce brittleness of Bi.

Patent Literature 2 discloses a sliding member having good conformability that is obtained by forming an overlay from a Bi alloy including Cu as an essential element and a predetermined amount of at least one or more optional elements selected from Sn and In to strengthen the alloy and overcome brittleness of Bi without deterioration in the fatigue resistance of the overlay.

CITATION LIST

Patent Literature

PATENT LITERATURE 1: JP 2001-020955 A
PATENT LITERATURE 2: JP 2004-353042 A

SUMMARY OF THE INVENTION

Strict production management is required to achieve the above effects of the Bi/Bi alloy overlays disclosed in the Patent Literatures. Furthermore, in recent years, performance of internal combustion engines with respect to $CO_2$ emission regulation has been improved and it has been causing severe operational environment of sliding members for the internal combustion engines. Thus, the fatigue properties of the conventional techniques is becoming insufficient.

Such a Bi/Bi alloy overlay is typically produced through plating, PVD, or CVD. In that case, grains of the overlay basically have a columnar structure, and thus are likely to cause a crack in a thickness direction even when the orientation of the grains is controlled as in Patent Literature 1. When a crack occurs, the crack at first progresses along a grain boundary of the columnar crystal structure toward the inside of the overlay. When the crack reaches a portion of the overlay at a certain depth, the crack branches into many cracks, and the cracks cause falling off of the overlay grains due to fatigue. This phenomenon is more likely to occur in high temperature environment and reduces a fatigue strength. Such falling off of the overlay grains due to fatigue basically can not be prevented by adding an alloy element to an alloy matrix to strengthen the alloy matrix.

An object of the present invention is to provide a sliding member having improved fatigue properties and reduce falling off of overlay grains due to fatigue.

According to an aspect of the present invention, provided is a sliding member including an overlay on a bearing alloy. The overlay has a sliding surface and an interface with the bearing alloy. The sliding surface and the interface define a thickness T. The overlay includes a matrix of Bi or a Bi alloy and intermetallic compounds. A volume ratio of the intermetallic compounds is 10% to 70% in a region extending between a position of the overlay at a depth of 70% of the thickness T of the overlay from the sliding surface toward the interface and a position of the overlay at a depth of 75% of the thickness T of the overlay from the sliding surface toward the interface.

According to an embodiment, in a cross-sectional view perpendicular to the sliding surface, the intermetallic compounds existing in a region extending between the sliding surface and the position of the overlay at the depth of 75% of the thickness T from the sliding surface toward the interface have a length, in a direction parallel to the sliding surface, being less than 2.5 times the thickness T.

According to an embodiment, in a cross-sectional view perpendicular to the sliding surface, among the intermetallic compounds existing in the region extending between the position of the overlay at the depth of 70% of the thickness T from the sliding surface toward the interface and the position of the overlay at the depth of 75% of the thickness T from the sliding surface toward the interface, at least three intermetallic compounds exist per length of 2.5 times the thickness T in a direction parallel to the sliding surface, the at least three intermetallic compounds extending at least from the position of the overlay at the depth of 70% of the thickness T from the sliding surface to the position of the overlay at the depth of 75% of the thickness T from the sliding surface.

According to an embodiment, in a cross-sectional view perpendicular to the sliding surface, at least one intermetallic compound among the at least three intermetallic compounds has an approximate ellipse shape, a major axis of the approximate ellipse shape forming an angle of not more than 70° with a direction perpendicular to the sliding surface.

Preferably, in a cross-sectional view perpendicular to the sliding surface, at least two intermetallic compounds among the at least three intermetallic compounds have approximate ellipse shapes, a major axes of each approximate ellipse shape forming an angles of not more than 70° with a direction perpendicular to the sliding surface, wherein an average distance d, in a direction parallel to the sliding surface, between centroids of adjacent ones of the at least two intermetallic compounds and a standard deviation σ of the average distance d satisfy, in units of micrometers, the following relation:

$$d+3\sigma \leq 150/T.$$

According to an embodiment, the overlay preferably includes a conforming layer, the conforming layer having the sliding surface and a volume ratio of the intermetallic compounds in the conforming layer being not more than 5%. Grains of the matrix of Bi or a Bi alloy of the conforming layer preferably have an isotropic index of not less than 20%.

According to an embodiment, the intermetallic compounds preferably comprise at least two elements selected from Bi, Sn, Cu, Zn, Co, Mn, Ni, In, Sb, and Ag.

According to another aspect of the present invention, provided is a bearing including the sliding member described above.

According to still another aspect of the present invention, provided is an internal combustion engine including the above bearing.

The present invention and its many advantages are described in more detail below with reference to the accompanying schematic drawings. The drawings illustrate non-limiting embodiments merely for illustration purpose.

DESCRIPTION OF EMBODIMENTS

During operation of an internal combustion engine, a high load is applied to a sliding member of the internal combustion engine. The high load causes a crack on a surface of the sliding member, and the crack propagates along a grain boundary of a columnar crystal of Bi or a Bi alloy of an overlay. When the crack reaches a portion of the overlay at a certain depth with respect to a thickness of the overlay, the crack branches into cracks, and the cracks progress in random directions. This causes a large number of grains of the overlay to fall off due to fatigue, resulting in significant performance deterioration leading to seizure.

The inventors have found that such crack branching mainly occurs in a region at a depth of 70% to 75% of a thickness T of the overlay from a surface of the overlay. Thus, the present invention is provided to increase a strength of this region to prevent the progress of the crack branching, thereby preventing falling off of a large number of overlay grains due to fatigue.

Figure 1:
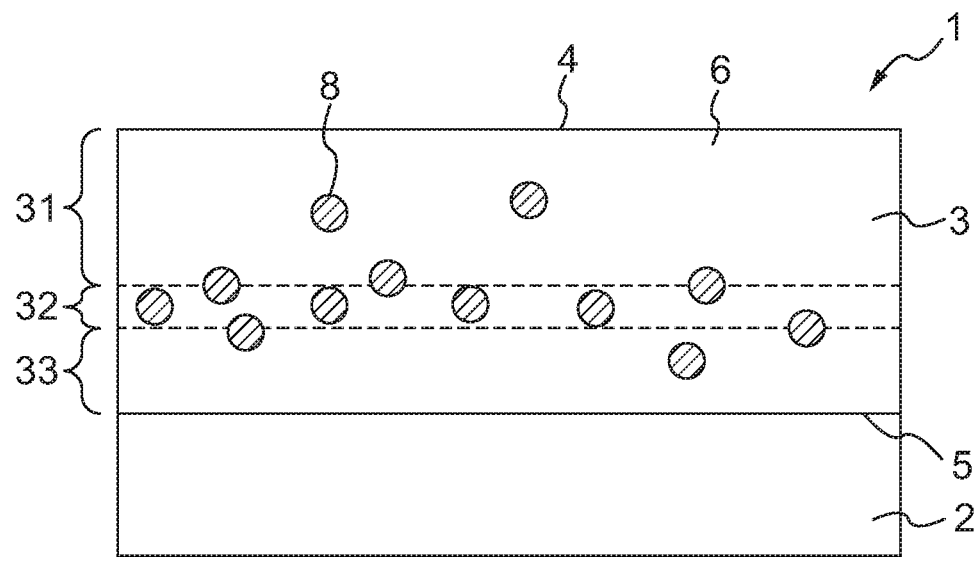
FIG. 1 is a schematic cross-sectional view of a sliding member according to an embodiment of the present invention.

FIG. 1 is a schematic cross-sectional view of a sliding member according to an embodiment of the present invention. A sliding member 1 includes a bearing alloy 2 and an overlay 3 on the bearing alloy. The overlay 3 has an interface 5 with the bearing alloy 2 and has a surface 4 on a side opposite to the interface 5. The thickness T of the overlay is defined as a distance between the surface 4 and the interface 5. The surface 4 functions as a sliding surface of the sliding member. The thickness T of the overlay 3 is preferably 3 to 50 μm, and more preferably 5 to 30 μm, but is not limited to these thicknesses. In a structure of the overlay 3, intermetallic compounds 8 are dispersed in a matrix 6 of Bi or a Bi alloy.

The bearing alloy 2 may be made of a material typically used as a bearing alloy, such as copper or a copper alloy, or aluminum or an aluminum alloy. The sliding member may further include a back metal that supports the bearing alloy. The back metal may be a metal plate made of an Fe alloy such as hypoeutectoid steel or stainless steel, Cu, a Cu alloy, or the like.

Herein, in the overlay 3, following three regions are defined:
a region extending from the surface 4 of the overlay 3 to a position of the overlay 3 at a depth of 70% of the thickness T from the surface 4 is referred to as a "surface side region 31";
a region extending from the position of the overlay 3 at the depth of 70% of the thickness T from the surface 4 to a position of the overlay 3 at a depth of 75% of the thickness T from the surface 4 is referred to as an "intermediate region 32" or a "falling off starting region"; and
a region extending from the position of the overlay 3 at the depth of 75% of the thickness T from the surface 4 of the overlay 3 to the interface 5 is referred to as an "interface side region 33".

In the embodiment of the present invention, a volume ratio of the intermetallic compounds 8 in the intermediate region 32 is 10% to 70%. While the intermediate region 32 is a region in which crack branching occurs, the intermetallic compounds 8 at the above ratio in the intermediate region 32 can reduce crack branching. The volume ratio of the intermetallic compounds is not defined in the surface side region 31 or the interface side region 33 according to the embodiment of the invention. A volume of the intermetallic compounds included in the intermediate region 32 is 10 to 70 volume %, and preferably 15 to 60 volume % relative to the entire overlay. In order to prevent falling off of the overlay grains, it is important that the intermediate region 32 includes the intermetallic compounds 8 at the above volume ratio. For intermetallic compounds 8 in the intermediate region 32 and extending in a region/regions other than the intermediate region 32, the volume ratio of such compounds is measured by a volume of the intermetallic compounds 8 within the intermediate region 32, when the volume ratio of the intermetallic compounds 8 in the intermediate region 32 is measured. Here, a value of the volume ratio of an intermetallic compound can be obtained as a value of an area ratio of the intermetallic compound in a measurement field of view.

The intermetallic compound is not particularly limited, but preferably includes at least two elements selected from Bi, Sn, Cu, Zn, Co, Mn, Ni, In, Sb and Ag.

In the embodiment, the intermetallic compounds included in the surface side region 31 and the intermediate region 32 have a length of less than 2.5 times, preferably not more than 2.3 times, and more preferably not more than 1.0 time the thickness T of the overlay in a direction parallel to the surface 4 (sliding surface) in a cross-sectional view perpendicular to the sliding surface (hereinafter, a direction parallel to the surface (sliding surface) 4 is also referred to as a "lateral" direction, and a direction perpendicular to the surface 4 is also referred to as a "vertical" direction).

However, the surface side region 31 and the intermediate region 32 may include approximately one intermetallic compound having a length of not less than 2.5 times the thickness T of the overlay, per 10 mm in the lateral direction. If the intermetallic compounds 8 extend long in the lateral direction, when a crack reaches the intermetallic compounds 8, the crack may progress along an boundary between the intermetallic compound 8 and the matrix 6, causing falling off of the grains. This phenomenon can be prevented when the intermetallic compounds 8 have the above length in the lateral direction. The length of the intermetallic compounds 8 in the lateral direction indicates a lateral distance between the endmost portions of each of the intermetallic compounds 8 in the lateral direction in the cross-sectional view. In measurement of the length of the intermetallic compounds 8 in a direction parallel to the sliding surface, the length of the intermetallic compounds 8 extending in the interface side region 33 in a measurement field of view is obtained by measuring a length of the intermetallic compounds 8 included in the surface side region 31 and the intermediate region 32.

Figure 2:
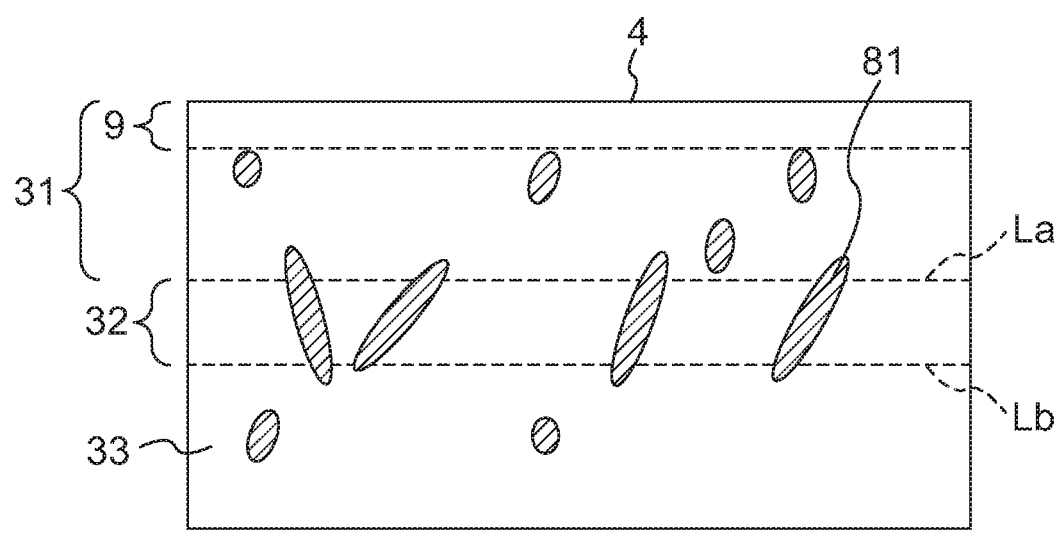
FIG. 2 is an enlarged schematic cross-sectional view of a portion in the vicinity of an intermediate region of an overlay of the sliding member according to an embodiment of the present invention.

FIG. 2 is an enlarged schematic cross-sectional view of a portion in the vicinity of the intermediate region 32 of the overlay of the sliding member according to a preferred embodiment of the present invention. The intermetallic compounds 8 in the intermediate region 32 include an intermetallic compound that is in contact with or intersects with a boundary La between the intermediate region 32 and the surface side region 31 and that is also in contact with or intersects with a boundary Lb between the intermediate region 32 and the interface side region 33 (this type intermetallic compound is hereinafter referred to as an "intermediate-region-vertically-crossing intermetallic compound 81"). That is, the intermediate-region-vertically-crossing intermetallic compound 81 extends across the entire thickness of the intermediate region 32 in the vertical direction. The intermetallic compounds 8 preferably include at least three, and more preferably five intermediate-region-vertically-crossing intermetallic compounds 81 per length of 2.5 times the thickness T of the overlay 3 in the lateral direction in a cross-sectional view perpendicular to the sliding surface 4. Since the intermediate-region-vertically-crossing intermetallic compounds 81 extend across the vertically direction of the intermediate region 32, the intermediate-region-vertically-crossing intermetallic compounds 81 effectively prevent propagation of cracking in the lateral direction in the intermediate region 32, and also function as supports for fixing the surface side region 31 to the interface side region 33 (an anchor effect), further enhancing the effect of preventing falling off of the grains. In particular, the intermediate-region-vertically-crossing intermetallic compounds 81 are preferably dispersed approximately evenly in the lateral direction. Please note that the phrase "an intermetallic compound is included in a region (one of the surface side region 31, the intermediate region 32, and the interface side region 33)" mean that at least a part of the intermetallic compound is included in the region.

In order to achieve the anchor effect by the intermediate-region-vertically-crossing intermetallic compounds 81, the intermediate-region-vertically-crossing intermetallic compounds preferably have a shape extending in the vertical direction. Thus, it is preferable that the at least three intermediate-region-vertically-crossing intermetallic compounds per length of 2.5 times the thickness T of the overlay in the lateral direction include at least one, preferably at least two, and more preferably at least three intermediate-region-vertically-crossing intermetallic compounds whose approximate ellipses have a major axis that forms an angle of not more than 70° with the vertical direction in a cross-sectional view perpendicular to the sliding surface. While calculating of the approximate ellipse is described later, an approximate ellipse of an outline of an intermetallic compound is obtained by determining, with use of image analysis software, an ellipse having an area equal to that of the intermetallic compound and having the same moments of inertia (first and second moments) as the intermetallic compound.

Furthermore, it is more preferable that the at least three intermediate-region-vertically-crossing intermetallic compounds 81 per length of 2.5 times the thickness T of the overlay in the lateral direction include at least two intermediate-region-vertically-crossing intermetallic compounds whose approximate ellipses have a major axis that forms an angle of not more than 70° with a direction perpendicular to the sliding surface in a cross-sectional view perpendicular to the sliding surface 4 and that an average distance d in the lateral direction between centroids of adjacent ones of the at least two intermediate-region-vertically-crossing intermetallic compounds and a standard deviation σ of the average distance d satisfy, in units of micrometers, the following relation:

$$d+3\sigma \le 150/T.$$

This indicates that most of the distance in the lateral direction between the centroids of the adjacent intermetallic compounds (which is smaller than the average d, or a larger than the average d but not larger than the average d+3σ) not more than 150/T. That is, the distance d+3σ needs to be small when the thickness T is large, and the distance d+3σ) may be large when the thickness T is small. When the thickness T is large, falling off of the grains due to fatigue is more likely to occur, and thus the intermetallic compounds are required to be dense.

The overlay 3 preferably includes a conforming layer 9 that has the sliding surface 4 of the overlay 3 and in which the volume ratio of the intermetallic compounds 8 is not more than 5%. The conforming layer 9 preferably has a thickness of not less than 1 μm, and more preferably not less than 3 μm and not more than 8 μm, but the conforming layer 9 does not extend to the intermediate region 32. The conforming layer 9 may include not more than 5 volume % of intermetallic compounds 8, and in such a case, the intermetallic compounds 8 preferably have a grain size of not more than 3 μm. Due to the conforming layer 9, the overlay 3 can maintain its conformability regardless of the existence of the intermetallic compounds 8.

In the conforming layer 9, the grains of the matrix of Bi or a Bi alloy preferably have an isotropic index of not less than 20%. The isotropic index is a value, expressed by percent, of a parameter Str indicating an aspect ratio of surface texture for surface roughness standardized as ISO 25178. The parameter Str is obtained by setting a grain boundary between grains in a measurement field of view as a valley having a predetermined depth. The isotropic index is increased as the degree of deflection in the direction of the long side of the grain group is reduced. The isotropic index of not less than 20% achieves an effect of reducing the speed of progress of cracking in the depth direction from the surface. In the conforming layer 9, the grains of the matrix 6 of Bi or a Bi alloy preferably have an aspect ratio of not more than 3. The aspect ratio is obtained as an average of values L/S indicating a ratio between a maximum length L and a minimum length S of a line passing through a centroid of a grain observed in cross-sectional observation.

Next, an example of a method of forming an intermetallic compound is described. A bearing alloy is coated with a Bi/Bi alloy layer, for example, through electroplating, PVD, CVD, or the like, and the Bi/Bi alloy layer is further coated with a raw material element X of intermetallic compounds. The raw material element X is diffused toward the inside of the Bi/Bi alloy layer by heat treatment at an appropriate temperature for an appropriate time. Meanwhile, an element Y of the bearing alloy are diffused toward a surface of the Bi/Bi alloy layer. Thus, intermetallic compounds including X and Y are formed in the Bi/Bi alloy layer. The elements X and Y are selected to have a diffusion coefficient that allows formation of intermetallic compounds in an intermediate region of the Bi/Bi alloy layer. For example, an Sb coating is used when the bearing alloy is Cu or a Cu alloy. Furthermore, another layer including an element Z may be formed between the bearing alloy layer and the Bi/Bi alloy layer, and instead of the element Y of the bearing alloy, the element Z of the layer may be diffused to form intermetallic compounds including X and Z. For example, a Ag layer may be formed between a bearing alloy of Cu or a Cu alloy and a Bi/Bi alloy layer coated with Sb. Since the Bi/Bi alloy layer has a columnar crystal, the elements X and Y or Z are mainly diffused in a grain boundary of the columnar crystal. Thus, the intermetallic compounds tend to have a shape extending in a direction substantially perpendicular to the sliding surface.

In another example of the method of forming an intermetallic compound, it is possible to add elements that are deposited at the same time as the formation of the coating of an overlay. The elements may be at least two elements selected from Bi, Sn, Cu, Zn, Co, Mn, Ni, In, Sb, and Ag. For example, in case of Bi—Sn—Cu, intermetallic compounds are formed by an alloy plating process in which Sn and Cu are added to a sulfonic acid Bi plating bath. When plating is performed at an electric current density (e.g., 6 A/dm$^2$) higher than normal one, intermetallic compounds are more likely to be actively generated. By changing the electric current density during the plating process, intermetallic compounds can be generated only at a desired position.

Next, a measurement method is described.

Cross-sectional observation is carried out as follows. A sliding member is cut at a position in a direction perpendicular to a surface of the sliding member. It is then subjected to preprocessing such as mechanical polishing, ion milling, microtome processing, or wire saw processing, and a structure of an overlay of the sliding member is observed with use of a COMP image (reflected electron composition image) by a scanning electron microscope (SEM), or an electron probe microanalyzer (EPMA), or the like. It is preferable to use an appropriate observation method according to the material of the overlay that allows identification of a boundary between intermetallic compounds and a matrix. The observation field of view is preferably set to allow observation of a portion of the structure having a length of at least 2.5 times the thickness of the overlay in the lateral direction.

In the obtained image, the thickness T of the overlay is determined, and an imaginary line La is drawn at a position of the overlay at a depth of 70% of the thickness T from the surface of the overlay and an imaginary line Lb is drawn at a position of the overlay at a depth of 75% of the thickness T from the surface of the overlay so that the imaginary lines La and Lb are parallel to the surface. The imaginary line La is a boundary between a surface side region and an intermediate region, and the imaginary line Lb is a boundary between the intermediate region and an interface side region.

In the region defined between the imaginary lines La and Lb, that is, in the intermediate region, an area ratio of the intermetallic compounds is calculated in the electronic image by a general image analysis method (analysis software: Image-Pro Plus (Version 4.5) manufactured by Planetron, Inc.). At least three cross sections are observed to obtain an average area ratio, and the obtained average area ratio is determined as the area ratio of the intermetallic compounds. The area ratio corresponds to the volume ratio.

Furthermore, in the intermetallic compounds included in a region extending from the surface of the overlay to the position of the overlay at a depth of 75% of the thickness T from the surface of the overlay (the surface side region and the intermediate region), the endmost portions of each of the intermetallic compounds in the lateral direction are determined, and a length between the endmost portions in the lateral direction is obtained. The obtained length is confirmed to be not more than 2.5 times the thickness T of the overlay. Furthermore, among the intermetallic compounds included in the intermediate region, intermetallic compounds that are in contact with or intersect with both the imaginary line La and the imaginary line Lb (intermediate-region-vertically-crossing intermetallic compounds) are extracted, and the average number of the intermediate-region-vertically-crossing intermetallic compounds per length of 2.5 times the thickness T is detected. The above confirmation and detection are performed for at least three cross sections.

The intermediate-region-vertically-crossing intermetallic compounds extracted as above are subjected to elliptical approximation. In the elliptical approximation, an approximate ellipse of an intermediate-region-vertically-crossing intermetallic compound is obtained by assuming, with use of image analysis software (Image-Pro manufactured by Nippon Roper K.K.) in the obtained image, an ellipse having an area equal to that of the intermediate-region-vertically-crossing intermetallic compound and having the same moment of inertia as the intermediate-region-vertically-crossing intermetallic compound. Then, an angle formed by a major axis of the obtained approximate ellipse of each intermediate-region-vertically-crossing intermetallic compound with a direction perpendicular to the sliding surface is measured, and the average number of intermediate-region-vertically-crossing intermetallic compounds whose approximate ellipses have a major axis that forms an angle of not more than 70° with a direction perpendicular to the sliding surface is obtained per length of 2.5 times the thickness T.

Next, in the image, centroid coordinates of the intermediate-region-vertically-crossing intermetallic compounds whose approximate ellipses have a major axis that forms an angle of not more than 70° with a direction perpendicular to the sliding surface are obtained with use of the image analysis software. Then, a distance in the lateral direction between the centroids of the intermetallic compounds (a distance between the centroids of the intermetallic compounds projected in the lateral direction) is measured, and the average distance and the standard deviation are obtained. At that time, for the intermetallic compound located at the leftmost position in the field of view, a distance in the lateral direction from the left end of the field of view to the centroid of the leftmost intermetallic compound is also calculated as the distance in the lateral direction between the centroids, and for the intermetallic compound located at the rightmost position in the field of view, a distance in the lateral direction from the right end of the field of view to the centroid of the rightmost intermetallic compound is also calculated as the distance in the lateral direction between the centroids.

Then, a method of measuring the conforming layer is described. In the electronic image obtained for cross-sectional observation, the area ratio of the intermetallic compounds is obtained by the above method in a region extending from the surface of the overlay to a position of the overlay at a depth of 50% of the thickness T of the overlay from the surface of the overlay. When the area ratio is not more than 5%, next, the region extending from the surface of the overlay is increased to determine the maximum depth of the region at which the area ratio of the intermetallic compounds is not more than 5%. When the area ratio of the intermetallic compounds obtained first is more than 5%, the region is reduced to determine the maximum depth of the region at which the area ratio of the intermetallic compounds is not more than 5%. Furthermore, in the captured image, the intermetallic compounds are eliminated with use of the image analysis software from the conforming layer obtained in this manner. In the image from which the intermetallic compounds have been eliminated, the isotropic index is calculated with use of image software (Texture direction function of MountainsMap (registered trademark)).

EXAMPLES

On a back metal (a steel material having a thickness of 1.2 mm), a bearing alloy was sintered (a sintered copper alloy material having a thickness of 0.3 mm), then a Bi layer having a predetermined thickness was coated on the bearing alloy by electroplating, and then an Sb layer having a predetermined thickness was coated on the Bi layer. A plating thickness of the Bi and the Sb layers was totally 15 μm. Then, heat treatment was performed to form Bi—Sb—Cu-based intermetallic compounds in the Bi layer. Thus, samples of Examples 1 to 10 and Comparative Examples 11 and 12 were produced. The Sb layer was not left on a surface of these samples. On the other hand, a sample of Comparative Example 13 was produced by coating the bearing alloy on the back metal with a Bi layer having a thickness of 3 μm, then coating the Bi layer with an SbCu layer having a thickness of 2 μm, and then coating the SbCu layer with a Bi layer having a thickness of 10 μm. A sample of Comparative Example 14 was produced by coating the bearing alloy on the back metal only with a Bi layer (15 μm) without providing an Sb layer. Table 1 shows the production conditions (plating thickness, and heat treatment temperature and time period). A major axis direction of columnar crystal grains (a major axis direction of approximate ellipses) of the Bi layer before heat treatment was adjusted, by controlling a stirring condition by a flow of plating solution, to form an angle of not more than 15° on average with a direction perpendicular to the sliding surface in Examples 1 to 5 and 8 to 10 and Comparative Examples and to form an angle of not more than 10° on average in Examples 6 and 7. In Examples 8 to 10, infrared preheating treatment (240° C.) was performed before heat treatment to produce a conforming layer (3 μm) and control the isotropic index.

In the samples of Examples 1 to 4 and Comparative Examples 11 to 14, cross-sectional observation was performed by the method described above, and the volume ratio of the intermetallic compounds was obtained in a region extending from a position of the Bi layer at a depth of 70% of the thickness of the Bi layer from the surface of the Bi layer to a position of the Bi layer at a depth of 75% of the thickness of the Bi layer from the surface of the Bi layer. The intermetallic compounds included in a region extending from the surface of the Bi layer to the position of the Bi layer at a depth of 75% of the thickness T from the surface of the Bi layer were checked for the existence of intermetallic compounds (strip-shaped intermetallic compounds) having a length of not less than 2.5 times the thickness T in a direction parallel to the surface. The results regarding the volume ratio of the intermetallic compounds and the existence of strip-shaped intermetallic compounds are respectively shown in a column "Intermetallic compounds in intermediate region" and a column "Strip-shaped intermetallic compounds" in Table 1.

Next, the samples were processed into cylindrical sliding bearings having a diameter of 56 mm and a length of 18 mm with the Bi layer inside, and the sliding bearings were subjected to a fatigue test. Table 3 shows the test conditions. After the test, fatigue was observed partially on the surface of the Bi layer of the samples. An area ratio of a region where no fatigue was observed, in other words a region where a fatigue region is excluded. The results are shown in a column "Area ratio without fatigue" in Table 1. The results in Table 1 show that the area ratio without fatigue of Examples of the present invention was larger than that of Comparative Examples.

Table 2 shows an influence of the ratio between the length of the intermetallic compounds in a direction parallel to the sliding surface and the overlay thickness (plating thickness) on fatigue properties (the area ratio without fatigue).

TABLE 1

| | Plating thickness (μm) | | Heat treatment | | Intermetallic compounds in intermediate region | Strip-shaped intermetallic | Area ratio (%) without |
|---|---|---|---|---|---|---|---|
| | Bi layer | Sb layer | Temperature (° C.) | Time (hr) | region (volume %) | compounds | fatigue |
| Example 1 | 10 | 5 | 140 | 10 | 65 | Present | 70 |
| Example 2 | 12 | 3 | 140 | 10 | 42 | Present | 75 |
| Example 3 | 14 | 1 | 140 | 10 | 12 | Present | 70 |
| Example 4 | 12 | 3 | 150 | 10 | 41 | Not present | 80 |
| Comparative Example 11 | 7 | 8 | 140 | 10 | 76 | Present | 55 |
| Comparative Example 12 | 14.5 | 0.5 | 140 | 10 | 5 | Not present | 45 |
| Comparative Example 13 | Bi(3) + SbCu(2) + Bi(10) | | — | — | 100 | Present | 55 |
| Comparative Example 14 | 15 | 0 | — | — | 0 | Not present | 45 |

TABLE 2

| | Plating thickness (μm) | | Heat treatment | | Intermetallic compound length in direction parallel to sliding surface/ overlay thickness | Area ratio (%) without fatigue |
|---|---|---|---|---|---|---|
| | Bi layer | Sb layer | Temperature (° C.) | Time (hr) | | |
| Example 2 | 12 | 3 | 140 | 10 | 2.8 | 75 |
| Example 4 | 12 | 3 | 150 | 10 | 1.8 | 80 |

TABLE 3

| Tester | Fatigue tester |
|---|---|
| Rotational speed | 3250 rpm |
| Peripheral speed | 9.0 m/s |
| Lubrication oil | VG68 |
| Oil supply temperature | 120° C. |
| Maximum load | 100 MPa |
| Load mode | 15 MPa/15 min |
| Holding time | 15 hours |

The number of intermediate-region-vertically-crossing intermetallic compounds per length of 2.5 times the thickness T of the Bi layer in the lateral direction, and among the intermediate-region-vertically-crossing intermetallic compounds, the number of intermediate-region-vertically-crossing intermetallic compounds whose approximate ellipses had a major axis that formed an angle of not more than 70° with the vertical direction were measured, and the results are respectively shown in a column "Intermediate region vertically crossing" and a column "Approximate ellipse major axis angle of not more than 70°" of a column "Number of intermetallic compounds" in Table 4. Furthermore, a column "(d+3σ)T" in Table 5 shows a value of (d+3σ)×T for the average distance d (μm) in the lateral direction between centroids of adjacent ones of the intermediate-region-vertically-crossing intermetallic compounds whose approximate ellipses had a major axis that formed an angle of not more than 70° with the vertical direction, the standard deviation σ (μm) of the average distance d, and the thickness T (μm) of the Bi layer. Tables 4 and 5 also show the area ratio without fatigue.

TABLE 4

| | Plating thickness (μm) | | Heat treatment | | Number of intermetallic compounds | | Area ratio (%) without fatigue |
|---|---|---|---|---|---|---|---|
| | | | | | Intermediate region vertically crossing | Approximate ellipse major axis angle of not more than 70° | |
| | Bi layer | Sb layer | Temperature (° C.) | Time (hr) | | | |
| Example 4 | 12 | 3 | 150 | 10 | 1 | 0 | 80 |
| Example 5 | 12 | 3 | 160 | 10 | 5 | 0 | 85 |
| Example 6 | 12 | 3 | 160 | 10 | 4 | 3 | 90 |

TABLE 5

| | Plating thickness (μm) | | Heat treatment | | (d + 3σ)T | Area ratio (%) without fatigue |
|---|---|---|---|---|---|---|
| | Bi layer | Sb layer | Temperature (° C.) | Time (hr) | | |
| Example 6 | 12 | 3 | 160 | 10 | 160 | 90 |
| Example 7 | 12 | 3 | 160 | 30 | 120 | 95 |

The number of intermediate-region-vertically-crossing intermetallic compounds per the predetermined length was less than three in Example 4 (the same applies to Examples 1 to 3), and was not less than three in Examples 5 and 6. In particular, Example 6 included three intermediate-region-vertically-crossing intermetallic compounds whose approximate ellipses had a major axis that formed an angle of not more than 70° with a direction perpendicular to the surface of the Bi layer. Furthermore, Example 7 satisfied the relation of d+3σ≤150/T. The area ratio without fatigue was increased according to the configurations.

Next, in order to evaluate more clearly the difference in fatigue resistance, a high-speed fatigue test was performed with use of a high-speed fatigue tester. This tester performed a test different in load mode and the like from the fatigue test shown in Table 3, and performed the test under severer test conditions. The specimen shape was the same as that of the fatigue test described above, and the test conditions of the high-speed fatigue test are shown in Table 6.

TABLE 6

| Tester | High-speed fatigue tester |
|---|---|
| Rotational speed | 6000 rpm |
| Peripheral speed | 16.8 m/s |
| Lubrication oil | VG68 |
| Oil supply temperature | 120° C. |
| Maximum load | 60 MPa |
| Load mode | 20 MPa/10 min |
| Holding time | 30 minutes |

After the test, the surface of the Bi layer of the samples was observed. Then, fatigue was observed partially, as the results of the fatigue test described above. Also in the high-speed fatigue test, the samples were examined to measure an area ratio without fatigue. The results and the isotropic index are shown in a columns "Isotropic index" and "Area ratio without fatigue (high speed)" in Table 7. In Examples 8 to 10 in which the conforming layer was formed, the area ratio without fatigue was larger than in Example 2 in which no conforming layer was formed. In Examples 8 to 10, although no difference was observed in the results of the fatigue test described above, the severer high-speed fatigue test showed that the area ratio without fatigue was increased as the isotropic index was increased.

TABLE 7

| | Plating thickness (μm) | | Preheating time (min) | Heat treatment | | | Area ratio (%) without fatigue | Area ratio (%) without fatigue (high speed) |
|---|---|---|---|---|---|---|---|---|
| | Bi layer | Sb layer | | Temperature (° C.) | Time (hr) | Isotropic index | | |
| Example 2 | 12 | 3 | — | 140 | 10 | — | 75 | 50 |
| Example 8 | 12 | 3 | 10 | 140 | 10 | 10 | 80 | 60 |
| Example 9 | 12 | 3 | 20 | 140 | 10 | 23 | 80 | 65 |
| Example 10 | 12 | 3 | 30 | 140 | 10 | 52 | 80 | 70 |

Although the present invention has been described with reference to the embodiments, it is apparent to those skilled in the art that the present invention is not limited to the embodiments and various changes and modifications can be made within the principles of the present invention. While the present invention is preferably applied to a sliding member for a bearing used in an internal combustion engine, such as a sliding bearing and a thrust bearing, those skilled in the art will understand that the present invention is also applicable to other sliding members.

The invention claimed is:

1. A sliding member comprising an overlay on a bearing alloy,
    wherein the overlay includes a sliding surface and an interface with the bearing alloy, the sliding surface and the interface defining a thickness T of the overlay, and the overlay comprising a matrix of Bi or a Bi alloy and intermetallic compounds dispersed in the matrix,
    wherein a volume ratio of the intermetallic compounds is 10% to 70% in a region extending between a position of the overlay at a depth of 70% of the thickness T from the sliding surface toward the interface and a position of the overlay at a depth of 75% of the thickness T from the sliding surface toward the interface, and
    wherein the overlay includes a conforming layer, the conforming layer having the sliding surface and a volume ratio of the intermetallic compounds in the conforming layer being not more than 5%.

2. The sliding member according to claim 1, wherein, in a cross-sectional view perpendicular to the sliding surface, the intermetallic compounds existing in a region extending between the sliding surface and the position of the overlay at the depth of 75% of the thickness T have a length, in a direction parallel to the sliding surface, being less than 2.5 times the thickness T.

3. The sliding member according to claim 1, wherein, in a cross-sectional view perpendicular to the sliding surface, among the intermetallic compounds existing in the region extending between the position of the overlay at the depth of 70% of the thickness T and the position of the overlay at the depth of 75% of the thickness T, at least three intermetallic compounds exist per length of 2.5 times the thickness T in a direction parallel to the sliding surface, the at least three intermetallic compounds extending at least from the position of the overlay at the depth of 70% of the thickness T to the position of the overlay at the depth of 75% of the thickness T.

4. The sliding member according to claim 3, wherein, in a cross-sectional view perpendicular to the sliding surface, at least one intermetallic compound among the at least three intermetallic compounds has an approximate ellipse shape, a major axis of the approximate ellipse shape forming an angle of not more than 70° with a direction perpendicular to the sliding surface.

5. The sliding member according to claim 3, wherein, in a cross-sectional view perpendicular to the sliding surface, at least two intermetallic compounds among the at least three intermetallic compounds have approximate ellipse shapes, major axes of each approximate ellipse shape forming angles of not more than 70° with a direction perpendicular to the sliding surface, and
    wherein an average distance d, in a direction parallel to the sliding surface, between centroids of adjacent ones of the at least two intermetallic compounds and a standard deviation σ of the average distance d satisfy, in units of micrometers, the following relation:

$d + 3\sigma \leq 150/T.$

6. The sliding member according to claim 1, wherein grains of the matrix of Bi or a Bi alloy of the conforming layer have an isotropic index of not less than 20%.

7. The sliding member according to claim 1, wherein the intermetallic compounds comprise at least two elements selected from Bi, Sn, Cu, Zn, Co, Mn, Ni, In, Sb and Ag.

8. A bearing comprising the sliding member according to claim 1.

9. An internal combustion engine comprising the bearing according to claim 8.

* * * * *